(12) United States Patent
Fujisaki et al.

(10) Patent No.: US 12,290,784 B2
(45) Date of Patent: May 6, 2025

(54) REDUCER SUPPLY DEVICE

(71) Applicant: YANMAR HOLDINGS CO., LTD., Osaka (JP)

(72) Inventors: Keita Fujisaki, Osaka (JP); Yohei Kamata, Osaka (JP); Tsuyoshi Inoue, Osaka (JP); Yusuke Oda, Osaka (JP); Shigeru Aoki, Osaka (JP); Koki Shimizu, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 174 days.

(21) Appl. No.: 18/059,097

(22) Filed: Nov. 28, 2022

(65) Prior Publication Data
US 2023/0182074 A1    Jun. 15, 2023

(30) Foreign Application Priority Data

Dec. 14, 2021    (JP) ................................ 2021-202655

(51) Int. Cl.
*B01D 53/94* (2006.01)
*F01N 3/20* (2006.01)

(52) U.S. Cl.
CPC ..... *B01D 53/9495* (2013.01); *B01D 53/9404* (2013.01); *F01N 3/2066* (2013.01); *B01D 53/9418* (2013.01); *B01D 2251/2067* (2013.01); *F01N 2560/07* (2013.01); *F01N 2610/02* (2013.01); *F01N 2610/1433* (2013.01); *F01N 2610/1446* (2013.01); *F01N 2610/1453* (2013.01); *F01N 2610/146* (2013.01); *F01N 2900/04* (2013.01); *F01N 2900/1806* (2013.01); *F01N 2900/1808* (2013.01); *F01N 2900/1812* (2013.01); *F01N 2900/1824* (2013.01)

(58) Field of Classification Search
CPC combination set(s) only.
See application file for complete search history.

(56) References Cited

U.S. PATENT DOCUMENTS

| | | | |
|---|---|---|---|
| 2007/0160508 A1 | 7/2007 | Doumeki et al. | |
| 2007/0186542 A1* | 8/2007 | Hirata | B01D 53/90 60/301 |
| 2008/0282681 A1* | 11/2008 | Katou | F01N 3/106 60/286 |
| 2013/0118155 A1* | 5/2013 | Domon | F01N 3/10 60/274 |

(Continued)

FOREIGN PATENT DOCUMENTS

| | | |
|---|---|---|
| DE | 102011087288 A1 | 5/2013 |
| JP | 2019-015199 A | 1/2019 |

OTHER PUBLICATIONS

Extended European Search Report for Patent App No. 22210416.8 (Dated Mar. 6, 2023).

*Primary Examiner* — Binh Q Tran
(74) *Attorney, Agent, or Firm* — Future IP LLC; Tomoko Nakajima (57) ABSTRACT

To provide a reducer supply device that can be made compact and has excellent maintainability. The reducer supply device includes a nozzle unit that adjusts a flow rate of a reducer which is to be supplied to a NOx purification catalyst device; and a pump unit that supplies the reducer to the nozzle unit. The nozzle unit and the pump unit are arranged at positions offset from each other in top view.

10 Claims, 7 Drawing Sheets

(56) References Cited

U.S. PATENT DOCUMENTS

| | | | |
|---|---|---|---|
| 2015/0096287 A1* | 4/2015 | Qi | F01N 3/208 |
| | | | 60/286 |
| 2018/0238217 A1* | 8/2018 | Devito | F01N 3/208 |
| 2019/0195106 A1 | 6/2019 | Faizi et al. | |
| 2019/0301337 A1* | 10/2019 | Lorenz | F01N 3/208 |
| 2020/0009505 A1* | 1/2020 | Verma | F01N 3/2066 |
| 2020/0182117 A1 | 6/2020 | Morimitsu et al. | |

\* cited by examiner

REDUCER SUPPLY DEVICE

TECHNICAL FIELD

The present invention relates to a reducer supply device that supplies a reducer to a NOx purification catalyst device mounted on a ship or the like.

BACKGROUND ART

A NOx purification catalyst device mounted on a ship or the like requires supply of a reducer (for example, urea water). Patent Document 1 discloses a reducer supply device (urea water supply device) that includes a flow meter and an air supply unit arranged in a frame body, and a pump unit arranged outside the frame body.

PRIOR ART DOCUMENT

Patent Document

Patent Document 1: JP-A-2019-015199

SUMMARY OF INVENTION

Technical Problem

In the conventional technique as described in Patent Document 1, it is necessary to provide a reducer supply device for each NOx purification catalyst device, and conduct complicated work of connecting individual units in each reducer supply device. Conventionally, individual units have been connected by pipes in a shipyard. In this case, however, the pipes may be likely to accumulate air.

In addition, in order to enable the NOx purification catalyst device to be mounted on a smaller ship, it is desirable to arrange the reducer supply device in a compact manner. However, even if the reducer supply device is arranged in a compact manner, it is necessary to avoid deterioration of maintainability due to the compactness.

The present invention has been made in view of the above issues. An object of the present invention is to provide a reducer supply device that can be made compact and has excellent maintainability.

Solution to Problem

In order to solve the above issues, a reducer supply device according to a first aspect of the present invention supplies a reducer to an exhaust purification device, and includes: a reducer flow rate adjustment unit that adjusts a flow rate of the reducer which is to be supplied to the exhaust purification device; and a reducer pressure-feeding unit that supplies the reducer to the reducer flow rate adjustment unit, and the reducer flow rate adjustment unit and the reducer pressure-feeding unit are arranged at positions offset from each other in top view.

According to the above configuration, since the reducer flow rate adjustment unit and the reducer pressure-feeding unit are offset from each other in the top view, when a maintenance operation is to be performed from above the reducer supply device, one of the reducer flow rate adjustment unit and the reducer pressure-feeding unit does not interfere with access to the other in the relationship between the reducer flow rate adjustment unit and the reducer pressure-feeding unit, thereby improving maintainability of the reducer supply device.

In the reducer supply device, the reducer pressure-feeding unit may be arranged at a position lower than the reducer flow rate adjustment unit.

According to the above configuration, arranging the reducer pressure-feeding unit, which is a heavy component, at a low position makes it easy to assemble the reducer pressure-feeding unit at the time of maintenance. In addition, since the reducer flow rate adjustment unit and the reducer pressure-feeding unit are offset from each other, even if the reducer spills from the reducer flow rate adjustment unit at the time of maintenance, it is possible to restrain adhesion of the spilled reducer to the reducer pressure-feeding unit which is an electric device.

The reducer supply device may further include a gas purification unit that purifies a gas which is to be supplied to the reducer flow rate adjustment unit, and the gas purification unit may be arranged below the reducer flow rate adjustment unit.

According to the above configuration, since the gas purification unit which is not an electric device is arranged below the reducer flow rate adjustment unit, there is no particular problem even if the reducer is splashed on the gas purification unit at the time of maintenance of the reducer flow rate adjustment unit, and such an arrangement allows effective use of the space in the reducer supply device.

Further, the reducer supply device may include: a reducer inlet portion that connects a reducer tank to the reducer pressure-feeding unit; a reducer outlet portion that connects the exhaust purification device to the reducer flow rate adjustment unit; and a gas inlet portion that connects an air tank or a compressor to the gas purification unit, and the reducer inlet portion, the reducer outlet portion, and the gas inlet portion may be provided on a same side surface of the reducer supply device.

According to the above configuration, providing the inlet and outlet portions of the reducer and air on the same side surface of the reducer supply device makes it possible to easily attach and detach the pipes connected to these inlet and outlet portions, thereby achieving improvement in the maintenance efficiency of the reducer supply device.

In the reducer supply device, a relay pipe connecting the reducer inlet portion and the reducer pressure-feeding unit may be arranged at a spacing between the reducer inlet portion and the reducer pressure-feeding unit, and the relay pipe may have a reducer purification unit that purifies the reducer.

According to the above configuration, since the reducer purification unit is provided in the relay pipe, even if the reducer spills at the time of maintenance of the reducer purification unit (for example, at the time of replacement of the urea filter), it is possible to prevent a problem that the reducer is splashed on the reducer pressure-feeding unit.

The reducer supply device may further include a gas flow rate adjustment unit that controls a flow of gas that has passed through the gas purification unit, and the gas flow rate adjustment unit may be arranged above the reducer pressure-feeding unit. Alternatively, the reducer supply device may further include a terminal storage unit electrically connected to the gas flow rate adjustment unit, and the terminal storage unit may be arranged above the reducer pressure-feeding unit.

According to the above configuration, even if the gas flow rate adjustment unit or the terminal storage unit is disassembled at the time of maintenance, the reducer is not dropped. Arranging the gas flow rate adjustment unit or the terminal storage unit above the reducer pressure-feeding unit makes it possible to intensively arrange the units in the reducer supply device in a compact manner while effectively using the space above the reducer pressure-feeding unit.

In order to solve the above issues, a reducer supply device according to a second aspect of the present invention supplies a reducer to an exhaust purification device, and includes: a reducer flow rate adjustment unit that adjusts a flow rate of the reducer which is to be supplied to the exhaust purification device; and a reducer pressure-feeding unit that supplies the reducer to the reducer flow rate adjustment unit, the reducer pressure-feeding unit is arranged at a position lower than the reducer flow rate adjustment unit, the reducer flow rate adjustment unit and the reducer pressure-feeding unit are arranged to partially overlap each other in top view, and a non-electric component is arranged between the reducer flow rate adjustment unit and the reducer pressure-feeding unit at an overlapping portion of the reducer flow rate adjustment unit and the reducer pressure-feeding unit in the top view.

According to the above configuration, even if the reducer spills from the reducer flow rate adjustment unit at the time of maintenance, the spilled reducer is splashed on the non-electric component, so that it is possible to restrain the spilled reducer from directly adhering to the reducer pressure-feeding unit.

In addition, the reducer supply device may have a bottom member below the reducer flow rate adjustment unit and the reducer pressure-feeding unit.

According to the above configuration, since the bottom member is arranged below the reducer flow rate adjustment unit and the reducer pressure-feeding unit, even if the reducer spills at the time of maintenance of these units, the spills can be received by the bottom member, and the outflow of the reducer to other places can be prevented.

In the reducer supply device, each unit included in the reducer supply device may be attached to a device frame.

According to the above configuration, each unit is fixedly arranged and packaged in the device frame and each unit is optimally arranged in the package, which allows the compact arrangement. In addition, the packaged reducer supply device allows intensive maintenance. The whole package can be removed and subjected to maintenance work at a place other than the installation site.

Advantageous Effects of Invention

The reducer supply device of the present invention has an effect of improving maintainability of the reducer supply device by arranging the reducer flow rate adjustment unit and the reducer pressure-feeding unit, which are main constituent units, offset from each other in the top view, even when the individual units included in the reducer supply device are arranged close to each other so as to be compact.

DESCRIPTION OF EMBODIMENTS

First Embodiment

Figure 1:
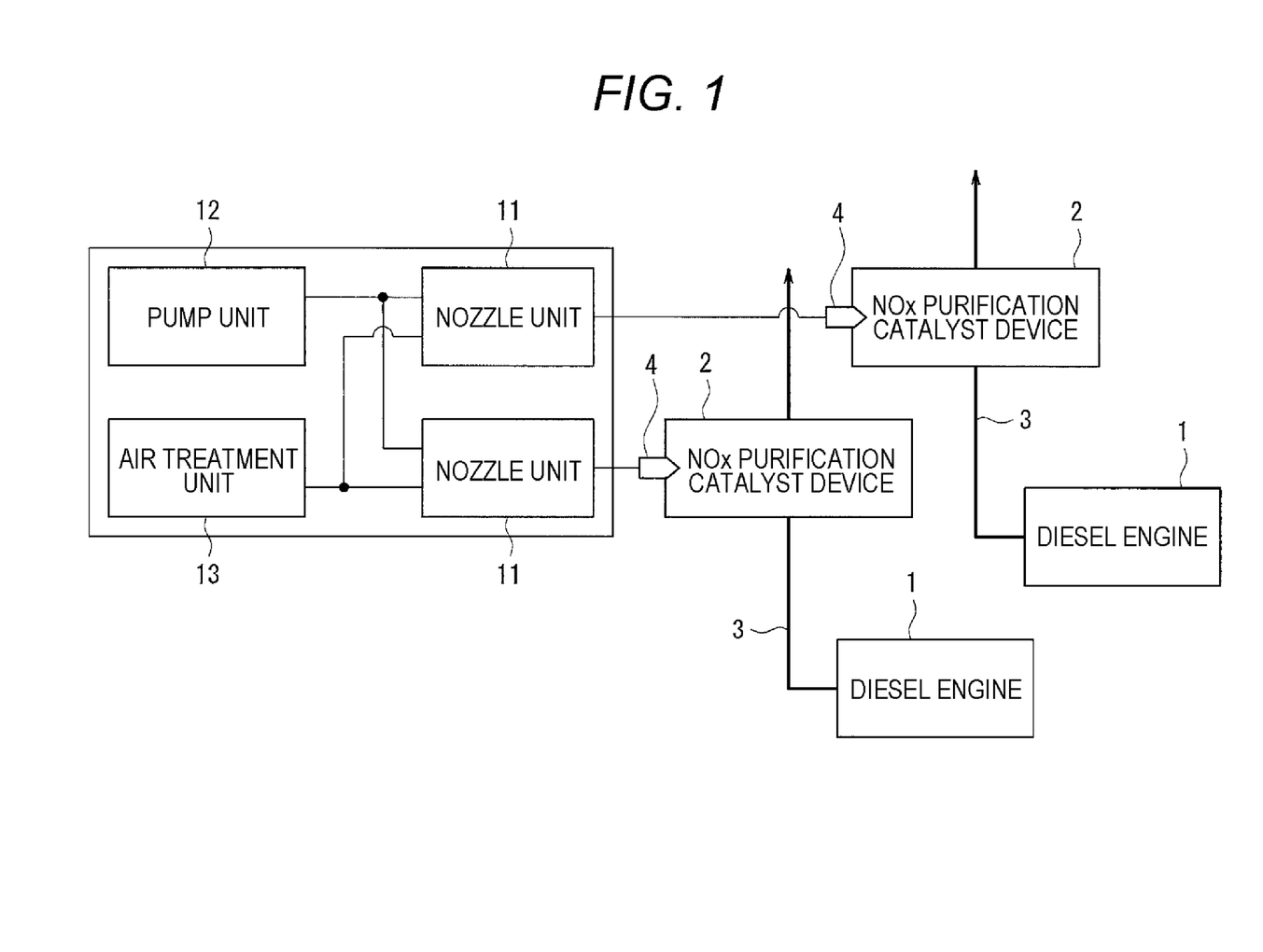
FIG. 1 is a schematic configuration diagram illustrating an exhaust purification system including a reducer supply device.

Hereinafter, embodiments of the present invention will be described in detail with reference to the drawings. FIG. 1 is a schematic configuration diagram illustrating an exhaust purification system including a reducer supply device 10 according to the present embodiment. The exhaust purification system illustrated in FIG. 1 is mounted on a ship, for example, and generally includes a diesel engine 1, a NOx purification catalyst device (exhaust purification device) 2, and a reducer supply device 10.

The diesel engine 1 is a propulsion engine that generates a driving force for propelling a ship or a power generation engine that generates a driving force for a generator which is to supply electric power used in a ship. The NOx purification catalyst device 2 is a device that is provided in an exhaust path 3 of the diesel engine 1 and purifies, by catalytic reduction, NOx (nitrogen oxide) contained in the exhaust gas generated in the diesel engine 1. When a plurality of diesel engines 1 is provided, the NOx purification catalyst device 2 is provided for each diesel engine 1. In the system illustrated in FIG. 1, two diesel engines 1 and two NOx purification catalyst devices 2 are provided.

The NOx purification catalyst device 2 requires a reducer supplied from the outside, in the process of purifying NOx. The reducer used here is a liquid, usually urea water. The reducer supply device 10 supplies the reducer to the NOx purification catalyst device 2.

The reducer supply device 10 includes a nozzle unit (reducer flow rate adjustment unit) 11, a pump unit (reducer pressure-feeding unit) 12, and an air treatment unit (gas purification unit) 13, as main components. The nozzle unit 11 is a unit that includes a flow meter and adjusts the flow rate of the reducer which is to be supplied to the NOx purification catalyst device 2. The nozzle units 11 are provided as many as the NOx purification catalyst devices 2 that receive the supply of the reducer from the reducer supply device 10 (two nozzle units 11 in the example of FIG. 1). The nozzle unit 11 includes a urea flow meter unit 111 and a display unit 112. The urea flow meter unit 111 and the display unit 112 are connected to each other by their respective flange portions.

The pump unit 12 is a unit that feeds the reducer to the nozzle unit 11. The air treatment unit 13 is a unit that purifies an assist air sent to a reducer injector 4 (has a filter function for the assist air). One pump unit 12 and one air treatment unit 13 are provided in the reducer supply device 10.

Figure 2:
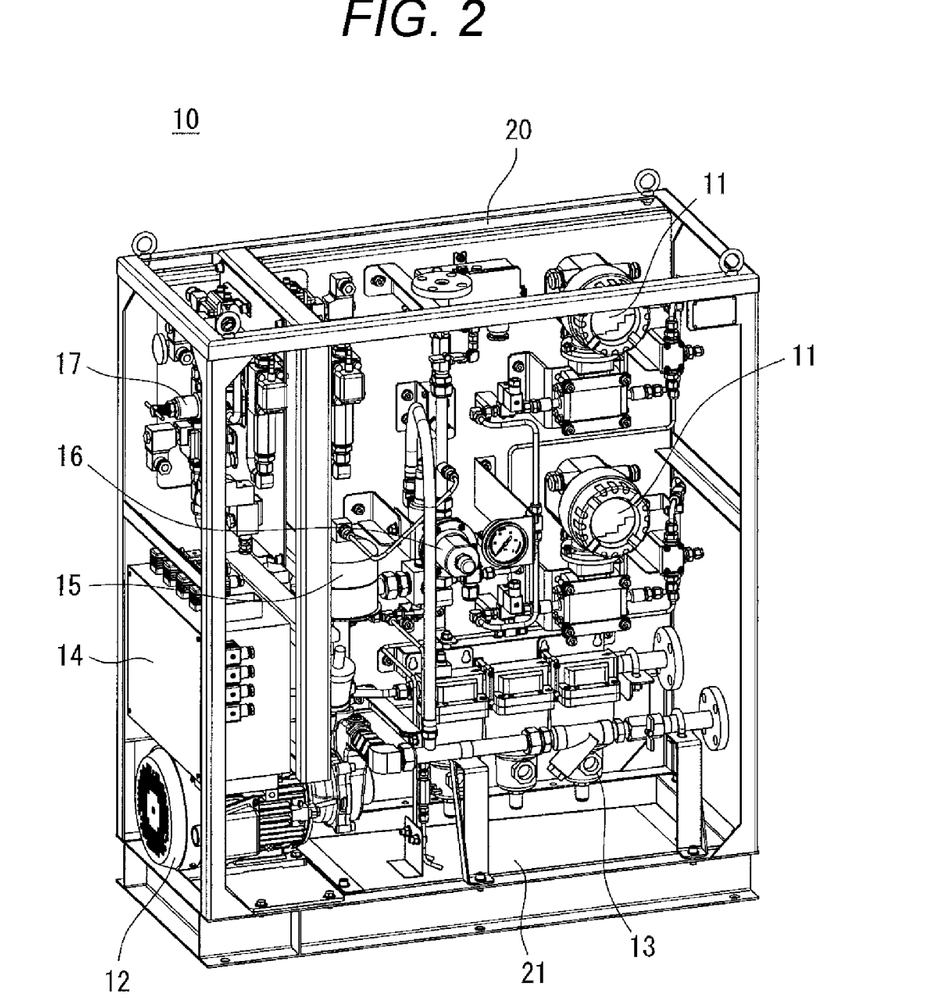
FIG. 2 illustrates one embodiment of the present invention, and is a perspective view of the reducer supply device according to a first embodiment.
Figure 3:
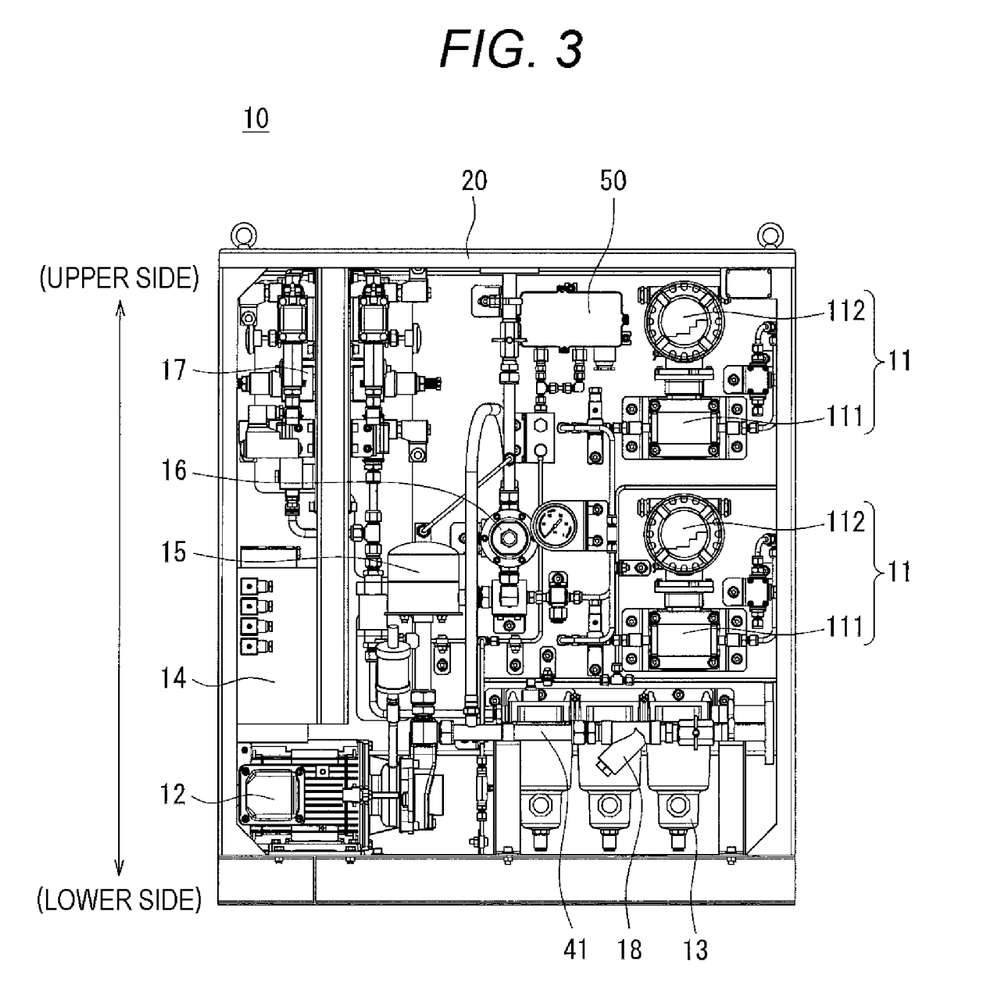
FIG. 3 is a front view of the reducer supply device according to the first embodiment.
Figure 4:
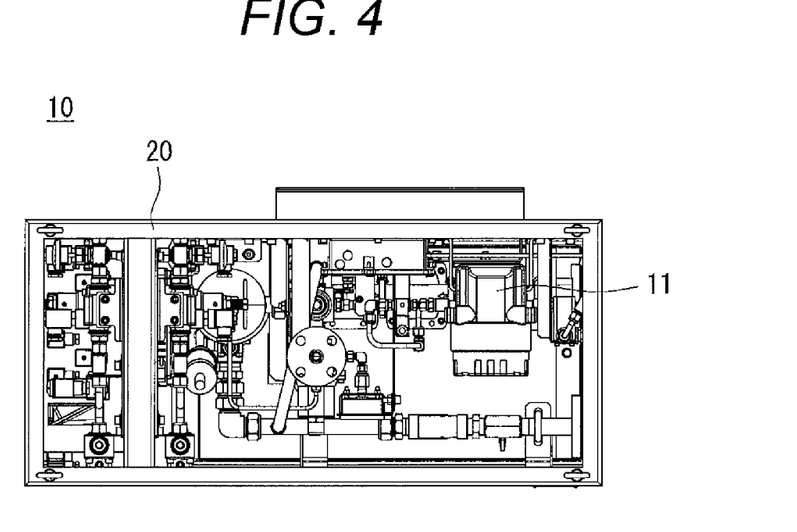
FIG. 4 is a top view of the reducer supply device according to the first embodiment.
Figure 5:
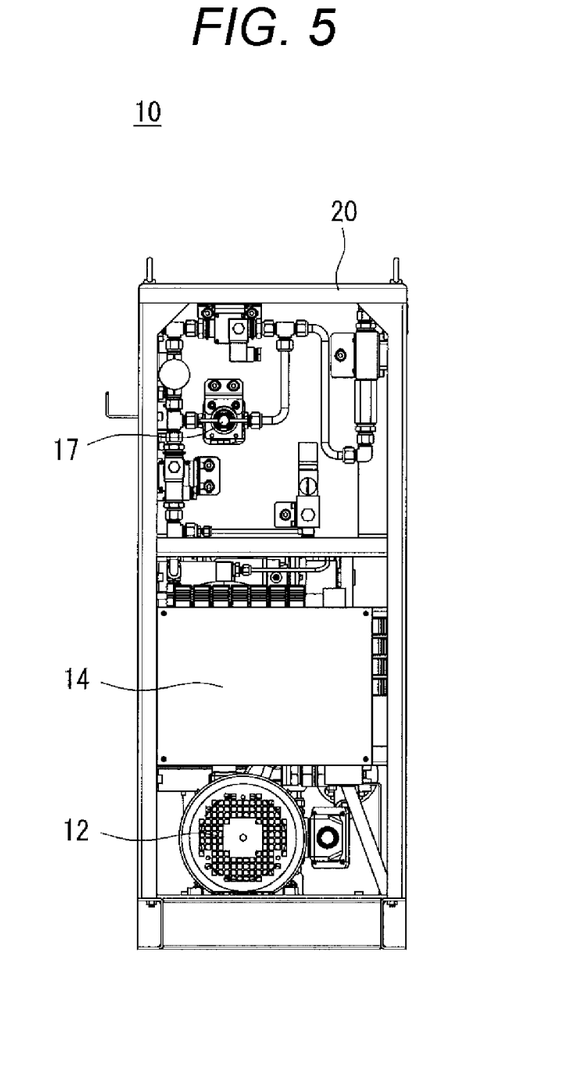
FIG. 5 is a right side view of the reducer supply device according to the first embodiment.
Figure 6:
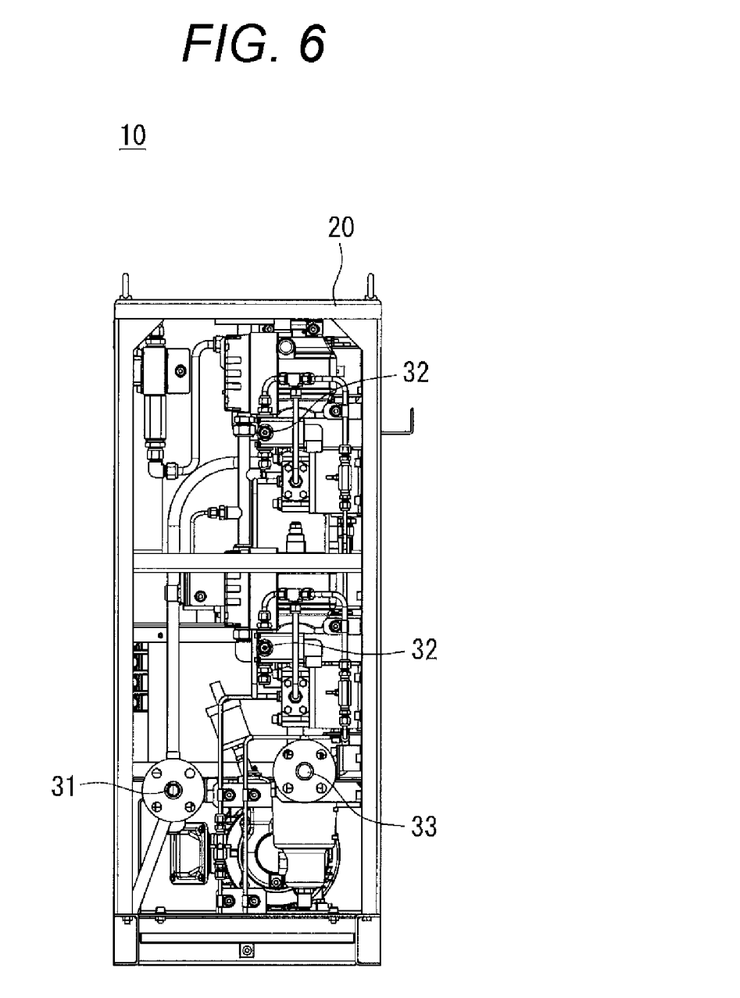
FIG. 6 is a left side view of the reducer supply device according to the first embodiment.

Subsequently, a specific configuration of the reducer supply device 10 according to the first embodiment will be described. FIG. 2 is a perspective view of the reducer supply device 10 according to the first embodiment. FIG. 3 is a front view of the reducer supply device 10 according to the first embodiment. FIG. 4 is a top view of the reducer supply device 10 according to the first embodiment. FIG. 5 is a right side view of the reducer supply device 10 according to the first embodiment. FIG. 6 is a left side view of the reducer supply device 10 according to the first embodiment. Here, the front side of the reducer supply device 10 is oriented in a direction in which the visible area of the reducer supply device 10 is the largest when the shape of the reducer supply device 10 is regarded as a substantially rectangular parallelepiped.

The reducer supply device 10 illustrated in FIGS. 2 to 6 includes, in addition to the nozzle unit 11, the pump unit 12, and the air treatment unit 13, units such as a terminal box (terminal storage unit) 14, an air bubble removing device 15, a metering valve 16, and a gas flow rate adjustment unit 17. The terminal box 14 is a unit that stores terminals (for example, a control terminal of an electromagnetic valve included in the gas flow rate adjustment unit 17 described later) in the reducer supply device 10. The air bubble removing device 15 is a device that removes air bubbles of the reducer sent from the pump unit 12 toward the nozzle unit 11. The metering valve 16 is a unit that controls an excess reducer not used in the nozzle unit 11 (reducer returned from the pump unit 12 to a reducer tank). The gas flow rate adjustment unit 17 controls the flow of air having passed through the air treatment unit 13. The gas flow rate adjustment unit 17 is a unit that includes an electromagnetic valve for switching between an assist mode (a mode in which compressed air is sent as assist air to the nozzle unit 11) and a purge mode (a mode in which the compressed air in the pipe is exhausted) and a flow meter.

The units included in the reducer supply device 10 are attached to a frame-shaped or box-shaped device frame 20, the positional relationship among the units is fixed, and the units are appropriately connected via pipes (reducer pipe and air pipe). As described above, the configuration in which the units are fixedly arranged in the device frame 20 is preferable because it is easy to remove only one unit from the reducer supply device 10 for maintenance. However, the units in the reducer supply device 10 may be arranged to be fixed to each other by connection via pipes. Therefore, the device frame 20 is not essential in the reducer supply device 10.

The reducer supply device 10 sends the reducer and the assist air to the NOx purification catalyst device 2. However, the reducer tank for storing the reducer and an air tank for storing compressed air which is to be the assist air may be externally attached to the reducer supply device 10 instead of being built in the reducer supply device 10. The reducer supply device 10 illustrated in FIGS. 2 to 6 exemplifies a type in which the reducer tank and the air tank are externally attached, and illustration of the reducer tank and the air tank is omitted. However, the reducer tank or air tank which is to be externally attached can be detachably attached to the outside of the device frame 20 (for example, the rear side of the device frame 20). The compressed air to be the assist air may be sent to the NOx purification catalyst device 2 not from the air tank but by the compressor.

The reducer supply device 10 is packaged by fixedly arranging the individual units in the device frame 20, and can be compactly configured by optimally arranging the units in the package. For this reason, the reducer supply device 10 can be easily mounted in a small ship. In addition, the reducer supply device 10 can be mounted as a whole package in a ship, which eliminates the necessity to connect the units by pipes in a shipyard. Furthermore, the reducer supply device 10 allows intensive maintenance by packaging. The whole package can be removed and subjected to maintenance work at a place other than the installation site.

The reducer supply device 10 is devised to avoid deterioration of maintainability in a case where the units are compactly arranged. That is, in order to compactly arrange the units in the reducer supply device 10, it is necessary to arrange the units close to each other. This may make it difficult to access a certain unit for maintenance because other units become obstacles. Otherwise, if the reducer (urea water) leaks from a unit under maintenance, there arises a problem that the leaking reducer is splashed on another unit (in particular, electric equipment) to cause a failure. The reducer supply device 10 according to the present embodiment has a configuration for solving these problems.

Firstly, at least the urea flow meter unit 111 of the nozzle unit 11 and the pump unit 12 are arranged at positions offset from each other in a top view of the reducer supply device 10. In addition, at least the urea flow meter unit 111 of the nozzle unit 11 and the pump unit 12 are preferably arranged at positions offset from each other also in a front view of the reducer supply device 10. In the reducer supply device 10 of the present example, at least the urea flow meter unit 111 of the nozzle unit 11 and the pump unit 12 are arranged in an offset manner in both the top view and the front view.

Since at least the urea flow meter unit 111 of the nozzle unit 11 and the pump unit 12 have different shapes, they are not arranged so as to completely overlap each other when viewed from any direction. Therefore, the offset arrangement of at least the urea flow meter unit 111 of the nozzle unit 11 and the pump unit 12 refers to a state in which the units do not completely overlap each other or a state in which the units are allowed to partially overlap when viewed from a certain direction. In addition, the state in which at least the urea flow meter unit 111 of the nozzle unit 11 and the pump unit 12 are allowed to partially overlap refers to a state in which an area of one unit overlapping the other unit is 35% or less (more preferably 30% or less) of the total area of the one unit.

If the nozzle unit 11 and the pump unit 12 are offset from each other in the top view, in a case of performing a maintenance operation from above the reducer supply device 10, one unit does not hinder access to the other unit in the relationship between the nozzle unit 11 and the pump unit 12, so that maintainability of the reducer supply device 10 is improved. Similarly, if the nozzle unit 11 and the pump unit 12 are offset from each other in the front view, the ease of maintenance work from the front is improved.

The pump unit 12 is preferably arranged at a position lower than the nozzle unit 11. Arranging the pump unit 12, which is a heavy component, at a low position facilitates assembly of the pump unit 12 at the time of maintenance. In a case where the pump unit 12 is arranged at the position lower than the nozzle unit 11 and the nozzle unit 11 and the pump unit 12 are offset from each other in the top view, even if the reducer spills from the nozzle unit 11 at the time of disassembling the nozzle unit 11 for maintenance, it is possible to restrain the spilled reducer from adhering to the pump unit 12 which is an electric device. This improves the maintainability of the nozzle unit 11 in the reducer supply device 10.

Secondly, the air treatment unit 13 is arranged below the nozzle unit 11. Since the air treatment unit 13 is not an electric device, arranging the air treatment unit 13 below the nozzle unit 11 causes no particular problem even if the reducer is splashed on the air treatment unit 13 at the time of maintenance of the nozzle unit 11. Further, when the pump unit 12 is arranged at the position lower than the nozzle unit 11, a space is generated below the nozzle unit 11. However, arranging the air treatment unit 13 in this space allows effective use of the space in the reducer supply device 10.

The nozzle unit 11 is preferably arranged near the outer peripheral portion of the reducer supply device 10 in order to facilitate connection with the NOx purification catalyst device 2. The nozzle unit 11 of the present example is arranged near the right side surface of the reducer supply device 10 (see FIG. 3). On the other hand, the air treatment unit 13 is also preferably arranged near the outer peripheral portion of the reducer supply device 10 in order to facilitate connection with the external air tank. When the air treatment unit 13 is arranged below the nozzle unit 11, the nozzle unit 11 and the air treatment unit 13 are positioned in the vicinity of the same side surface of the reducer supply device 10. This has an advantage that a maintenance worker of the reducer supply device 10 can perform maintenance on both of the units with little movement.

In this case, a reducer outlet portion 32 for connecting the NOx purification catalyst device 2 to the nozzle unit 11 and an air inlet portion (gas inlet portion) 33 for connecting the air tank to the air treatment unit 13 are preferably provided on the same side surface (in this example, the right side surface: see FIG. 6) of the reducer supply device 10. Furthermore, a reducer inlet portion 31 for connecting the external reducer tank to the pump unit 12 is also preferably provided on the same side surface as the reducer outlet portion 32 and the air inlet portion 33. In this manner, providing the inlet and outlet portions of the reducer and air on the same side surface of the reducer supply device 10 makes it possible to easily attach and detach the pipes connected to these inlet and outlet portions, thereby achieving improvement in the maintenance efficiency of the reducer supply device 10.

Thirdly, as illustrated in FIG. 3, a relay pipe 41 connecting the reducer inlet portion 31 and the pump unit 12 is arranged substantially horizontally between the reducer inlet portion 31 and the pump unit 12, and a reducer purification unit 18 for purifying the reducer (having a filter function for the reducer) is installed in an intermediate portion of the relay pipe 41. Since the reducer purification unit 18 is provided in the relay pipe 41, even if the reducer spills at the time of maintenance of the reducer purification unit 18 (for example, at the time of replacement of the urea filter), it is possible to prevent a problem that the reducer is splashed on the pump unit 12.

Fourthly, in the reducer supply device 10, a tray-shaped bottom member 21 is arranged below the nozzle unit 11 and the pump unit 12. The bottom member 21 is preferably attached as a bottom plate that covers the entire bottom surface of the device frame 20. Since the bottom member 21 is arranged below the nozzle unit 11 and the pump unit 12, even if the reducer spills at the time of maintenance of these units, the spilled reducer can be received by the bottom member 21, and the outflow of the reducer to other places can be prevented.

Fifthly, the gas flow rate adjustment unit 17 is arranged above the pump unit 12. Even if the gas flow rate adjustment unit 17 is, for example, disassembled at the time of maintenance, the reducer that is a liquid does not drop. Therefore, arranging the gas flow rate adjustment unit 17 above the pump unit 12 makes it possible to intensively arrange the units in the reducer supply device 10 in a compact manner while effectively using the space above the pump unit 12.

The terminal box 14 is also preferably arranged above the pump unit 12. Since the reducer does not drop also at the time of maintenance of the terminal box 14, arranging the terminal box 14 above the pump unit 12 makes it possible to intensively arrange the units in the reducer supply device 10 in a compact manner while effectively using the space above the pump unit 12.

Second Embodiment

Figure 7:
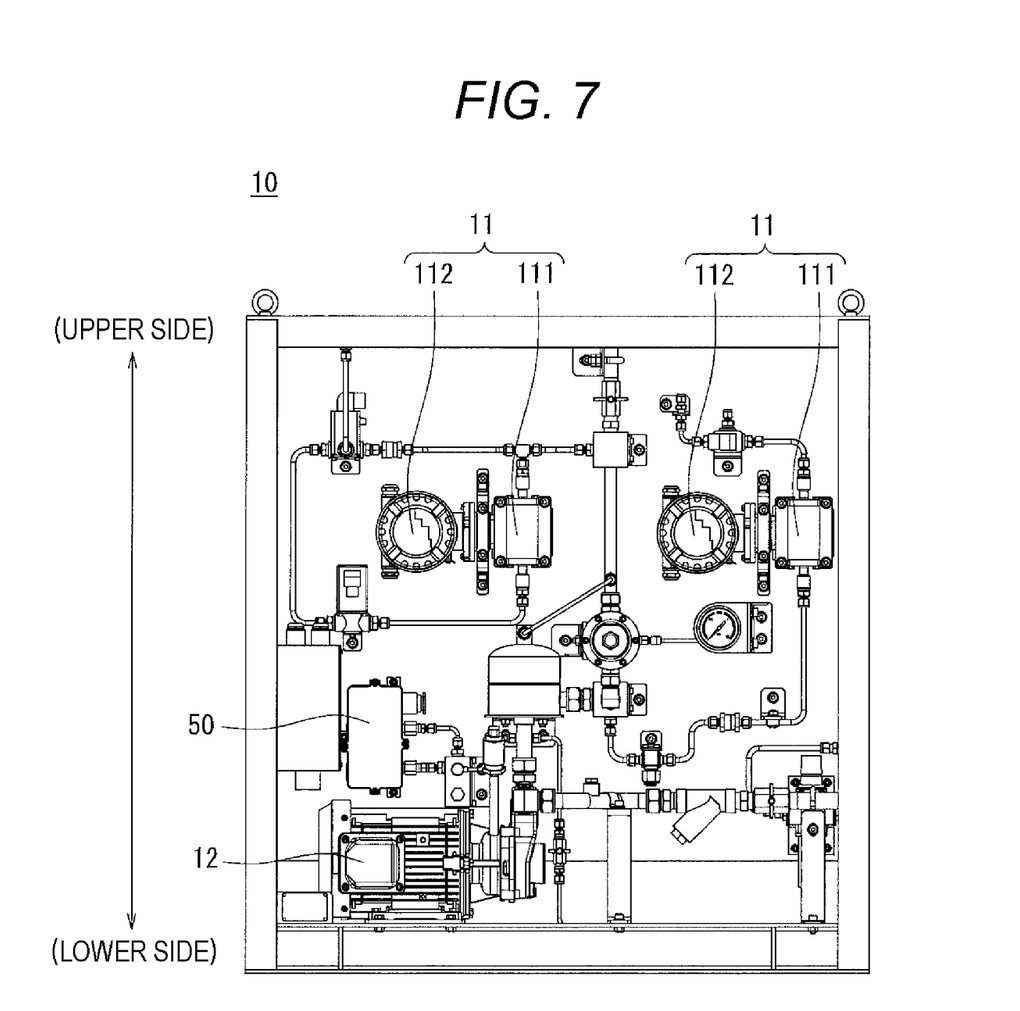
FIG. 7 is a front view of a reducer supply device according to a second embodiment.

In the exemplified configuration of the above-described first embodiment, the pump unit 12 is arranged at the position lower than the nozzle unit 11, and the nozzle unit 11 and the pump unit 12 are arranged offset from each other in the top view of the reducer supply device 10. This configuration has the effect of, even if the reducer spills from the nozzle unit 11 at the time of maintenance, restraining adhesion of the spilled reducer to the pump unit 12 which is an electric device. In relation to a second embodiment, another configuration example in which the reducer spilled from a nozzle unit 11 can be restrained from adhering to a pump unit 12 will be described. FIG. 7 is a front view of a reducer supply device 10 according to the second embodiment.

In the reducer supply device 10 according to the second embodiment, the pump unit 12 is arranged at a position lower than the nozzle unit 11, and the nozzle unit 11 and the pump unit 12 are arranged so as to partially overlap in a top view of the reducer supply device 10. Then, between the nozzle unit 11 and the pump unit 12, a non-electrical component is arranged at an overlapping portion of these units in the top view. In the example of FIG. 7, a pressure switch 50 is arranged as a non-electrical component. The pressure switch 50 is a unit that monitors the pressure of the pump unit on the outlet side and transmits an NG signal to the controller of the reducer supply device 10 when the pressure deviates from a set value.

In the reducer supply device 10 according to the second embodiment, even if the reducer spills from the nozzle unit 11 at the time of maintenance, the spilled reducer is splashed on the non-electric system component, but the spilled reducer does not directly adhere to the pump unit 12. Accordingly, as in the first embodiment, there is no concern that the reducer is splashed on the pump unit 12, thereby improving maintainability of the nozzle unit 11.

The embodiments disclosed herein are illustrative in all respects and do not provide a basis for a limited interpretation. Therefore, the technical scope of the present invention is not to be construed only by the above-described embodiments, but is defined based on the description of the claims. In addition, all modifications equivalent in meaning and scope to the claims are included in the present invention.

LIST OF REFERENCE SIGNS

1 Diesel engine
2 NOx purification catalyst device (exhaust purification device)
3 Exhaust path
4 Reducer injector
10 Reducer supply device
11 Nozzle unit (reducer flow rate adjustment unit)
111 Urea flow meter unit
112 Display unit
12 Pump unit (reducer pressure-feeding unit)
13 Air treatment unit (gas purification unit)
14 Terminal box (terminal storage unit)
15 Air bubble removing device
16 Metering valve
17 Gas flow rate adjustment unit
18 Reducer purification unit
20 Device frame
21 Bottom member
31 Reducer inlet portion
32 Reducer outlet portion
33 Air inlet portion (gas inlet portion)
41 Relay pipe
50 Pressure switch

The invention claimed is:

1. A reducer supply device that supplies a reducer to an exhaust purification device, comprising:
a reducer flow rate adjustment unit that adjusts a flow rate of the reducer which is to be supplied to the exhaust purification device; and
a reducer pressure-feeding unit that supplies the reducer to the reducer flow rate adjustment unit,
wherein the reducer flow rate adjustment unit and the reducer pressure-feeding unit are arranged at positions not overlapped from each other in a top view of the reducer supply device.

2. The reducer supply device according to claim 1, wherein the reducer pressure-feeding unit is arranged at a position lower than the reducer flow rate adjustment unit.

3. The reducer supply device according to claim 1, further comprising a gas purification unit that purifies a gas which is to be supplied to the reducer flow rate adjustment unit,
wherein the gas purification unit is arranged below the reducer flow rate adjustment unit.

4. The reducer supply device according to claim 3, further comprising:
a reducer inlet portion that connects a reducer tank to the reducer pressure-feeding unit;
a reducer outlet portion that connects the exhaust purification device to the reducer flow rate adjustment unit; and
a gas inlet portion that connects an air tank or a compressor to the gas purification unit,
wherein the reducer inlet portion, the reducer outlet portion, and the gas inlet portion are provided on a same side surface of the reducer supply device.

5. The reducer supply device according to claim 4, wherein
a relay pipe connecting the reducer inlet portion and the reducer pressure-feeding unit is arranged at a spacing between the reducer inlet portion and the reducer pressure-feeding unit, and
the relay pipe has a reducer purification unit that purifies the reducer.

6. The reducer supply device according to claim 3, further comprising a gas flow rate adjustment unit that controls a flow of gas that has passed through the gas purification unit,
wherein the gas flow rate adjustment unit is arranged above the reducer pressure-feeding unit.

7. The reducer supply device according to claim 6, further comprising a terminal storage unit electrically connected to the gas flow rate adjustment unit,
wherein the terminal storage unit is arranged above the reducer pressure-feeding unit.

8. A reducer supply device that supplies a reducer to an exhaust purification device, comprising:
a reducer flow rate adjustment unit that adjusts a flow rate of the reducer which is to be supplied to the exhaust purification device; and
a reducer pressure-feeding unit that supplies the reducer to the reducer flow rate adjustment unit,
wherein the reducer pressure-feeding unit is arranged at a position lower than the reducer flow rate adjustment unit, and the reducer flow rate adjustment unit and the reducer pressure-feeding unit are arranged to partially overlap each other in a top view of the reducer supply device, and
a non-electric component is arranged between the reducer flow rate adjustment unit and the reducer pressure-feeding unit at an overlapping portion of the reducer flow rate adjustment unit and the reducer pressure-feeding unit in the top view.

9. The reducer supply device according to claim 1, wherein a bottom member is provided below the reducer flow rate adjustment unit and the reducer pressure-feeding unit.

10. The reducer supply device according to claim 9, wherein each unit included in the reducer supply device is attached to a device frame.

* * * * *